United States Patent Office

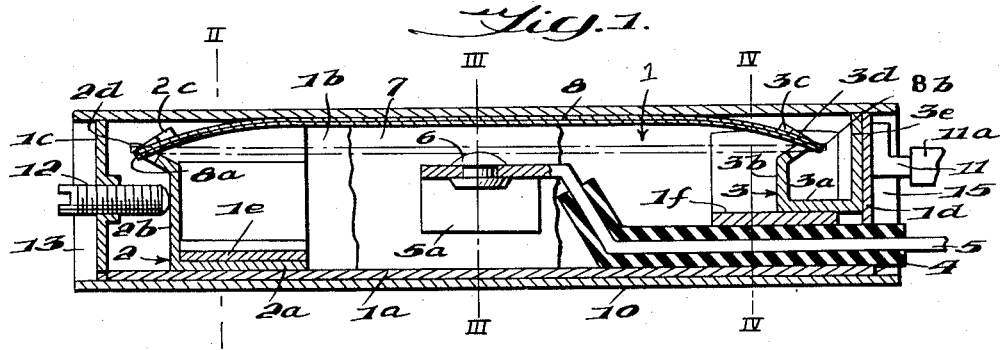

2,832,869
Patented Apr. 29, 1958

2,832,869

THERMOSTAT

Michel Lenoir, Lyon, France, assignor to Petercem, Societe Anonyme, Paris, France Application February 20, 1957, Serial No. 641,388

Claims priority, application France March 21, 1956

6 Claims. (Cl. 200—138)

This invention relates to thermostatic protective devices of the bimetallic type and in particular to those of the so-called "miniature" type which are used, for example, for the protection of coils of various types of electrical machines against abnormal heating due to abnormally high current conditions in the coil conductors. These thermostats are generally embedded in the coils and in direct heat transfer relation with the conductors themselves so as to be accurately and quickly responsive to any temperature change within the coil. As is known, the bimetallic element constitutes the movable element of the thermostatic switch and when heated up to a critical temperature flexes suddenly from is initial "cold" position to a new position in which it engages a fixed contact member and causes an electrical control circuit between the two to be closed thus opening the electrical circuit to the coil which it protects. Another use for these miniature thermostatic protective devices is for the protection of liquids against overheating, the device being, of course, sealed against entry of liquid but still thermally conductive so that the heat of the liquid reaches the heat-responsive bimetallic element.

The thermostat according to the present inventive concept is characterized by a very thin walled, elongated, heat conductive metallic casing preferably rectangular in cross section having plane inner surfaces and into which is slidingly inserted an elongated support plate upon which are mounted two longitudinally spaced end supports to which are anchored the corresponding ends of a bimetallic strip. The length of the bimetallic strip and the distance between the two end supports is so chosen that the strip when "cold" is curved longitudinally and presents its concave side to the stationary contact member of the switch and in spaced relation thereto. The convex side of the strip when "cold" is caused to bear against the inner face of the casing with an initial force, which preferably is adjustable, as by adjustment of the position of one of the end supports, and the position of the stationary contact member is such that it is substantially tangent to a plane passed through the axes about which the opposite ends of the strip on their respective supports oscillate as the strip flexes due to the heating thereof.

A typical embodiment of the invention is hereinafter described and is illustrated by the accompanying drawings in which like numerals indicate like components in the several views presented.

In the accompanying drawings,

Fig. 1 is a view in vertical longitudinal central section through the thermostat and which is drawn to a greatly enlarged scale for clarity in detail, the actually longitudinal dimension of the thermostat being of the order of one inch, or less;

Fig. 2 is a transverse section on line II—II of Fig. 1;

Fig. 3 is a transverse section on line III—III of Fig. 1;

Fig. 4 is a transverse section on line IV—IV of Fig. 1;

Fig. 5 is a top plan view of the thermostat;

Fig. 6 is a view of the end portion of one of the elastic support elements for receiving the corresponding end of the bimetallic strip;

Fig. 7 is a view of one end portion of the bimetallic strip; and

Fig. 8 is a view in side elevation of the thermostat shown in Fig. 1 after the ends thereof have been sealed.

With reference now to the drawings, and in particular to Fig. 1, the thermostat in accordance with the invention is seen to be comprised of an elongated support strip 1 which is made from relatively thin gauge electrically conductive metallic sheet material. This strip 1 is generally L-shaped in transverse section as indicated in Fig. 3 and comprises a base or foot portion 1a which is horizontal and an upstanding side or back plate portion 1b. The ends of the back plate portion 1b are turned normal thereto so as to form end flanges 1c and 1d. The left end of the back plate portion 1b has struck out from it a tongue portion 1e seen in Fig. 2 and which lies spaced from and parallel with the foot portion 1a to form a recess for receiving and securing therebetween the foot portion 2a of an L-shaped support plate 2 which can be made out of the same material as the support strip 1. The upstanding portion 2b of plate 2 which extends in a plane normal to the back plate portion 1b of the support strip terminates in an outwardly turned V-shaped portion 2c which is apertured at its apex to provide a hole 2d for anchoring one end of the bimetallic strip 8, the latter being provided with a longitudinally projecting tongue 8a which enters the hole 2d in plate 2.

At the opposite end portion of support strip 1 as seen in Fig. 4 another tongue portion 1f is struck out from the back plate 1b and also lies spaced from and parallel with the foot portion 1a to establish on its upper face a seat for the base portion 3a of a generally U-shaped support 3 which is required to be made of elastic, electrically conductive material such as for example beryllium copper. The left, upstanding side 3b of support 3 which is also normal to the plane of the back plate portion 1b terminates in an outwardly turned V-shaped portion 3c which is apertured at its apex to provide a hole 3d for anchoring the opposite tongued end 8b of the bimetallic strip 8. The right, upstanding side 3e of support 3, as seen in Fig. 1 bears against the inturned flange 1d of the support strip 1.

The space between the tongue portion 1f and foot portion 1a of the support strip 1 provides a recess for receiving the insulating sheath 4 of a conductor 5. The inner end of conductor 5 is offset and terminates in a silver contact button 6 which is riveted in place, and the contact button 6 is seen to be located midway between the ends of the bimetallic strip 8 for contact with the latter as it becomes heated and flexes with a snap action in a manner to be later described in more detail. The inner end of conductor 5 is also provided with depending side flanges 5a, 5b for better stability. One of these flanges 5a bears against a thin mica plate 7 inserted between the same and the inner face of the back plate portion 1b so as to electrically insulate the same from the latter, and the other flange 5b bears against another thin mica plate 9 inserted between the same and the corresponding inner face of a metallic casing 10, rectangular in configuration, and which encloses the assembly comprising the angle support strip 1 and those elements which the latter carries.

A second conductor 11, insulated by a sheath 11a and which can be connected as shown in Fig. 1 to the inturned flange 1d of support strip 1 provides an electrical connection to the bimetallic strip 8 since one end of the latter is connected to electrically conductive support plate 3 and the latter is in surface contact with the inturned electrically conductive flange 1d. It is also possible to electrically connect conductor 11 to the bimetallic strip 8 by connecting it to the casing 10 itself when the latter is made out of electrically conductive material since the support 3, to which bimetallic strip 8 is connected, is also made of electrically conductive material and the latter is in surface contact with the inner wall of casing 10.

As indicated in Fig. 6, the upper end of support member 2 is bent according to the axes x—x' and y—y'. The upper end of support member 3 is also bent in a similar manner and the ends of bimetallic strip 8 mounted between said support members are thus able to oscillate about axes y—y' of each such support member as the bimetallic strip flexes when its temperature is changed.

When the bimetallic strip 8 is relatively "cold" and mounted upon its end supports 2 and 3 it will take a generally convex curvature in the direction away from the contact button 6. The dimensions of the casing 10 are so chosen that when the assembly of the support strip 1 and the bimetallic element 8 are inserted within the same as indicated in Fig. 1, the central portion of the otherwise initially convexly curved bimetallic 8 will bear against the inner top face of the casing 10 and be flattened or "compressed" to the extent shown in Fig. 1. The initial working temperature of the thermostat is a function of this initial "compression" of the bimetallic strip 8 and the present invention also provides means for regulating it, such means being constituted by a screw 12 projecting longitudinally into the left end of the casing 10 and which is threaded through the corresponding end flange 1c of the support strip 1 into contact with the upstanding portion 2b of plate 2 to which one end of the bimetallic strip 8 is attached. Thus by turning the screw 12 in one direction or the other, its pressure against the upstanding yieldable portion 2b of plate 2 can be regulated and this in turn regulates the flexing or biasing pressure applied to the bimetallic strip 8 and which has to be overcome by the reaction forces developed in the bimetallic strip 8 as the latter is heated.

After the screw 12 has been adjusted to give the proper regulation on the bimetallic strip 8, the end cavity 13 at the screw end of casing 10 can be sealed, as shown in Fig. 8, with a heat resistant solid material 14 such as for example a resin known by the trade name "Araldite" so as to completely cover the slotted head end of screw 12 thus sealing this end of the casing and preventing the screw from getting out of adjustment. The cavity 15 at the opposite end of the casing 11 where the conductors 5 and 11 enter, can also be sealed with this same type of material 16 thereby minimizing the chance of accidental breakage of these at the casing or disturbance of the position of the contact button 6 in relation to the center point of the bimetallic element 8.

In operation, the casing 10 of the thermostatic switch element according to the invention is placed in surface contact, i. e. in heat transfer relation, with the current carrying conductor coil to be protected against abnormal temperature rise due to over-current condition. As the conductor heat rises and thus also causes heating of the casing 10 and the bimetallic strip 8 inside the same, surface forces on the strip 8 are created and the action is equivalent to a single applied force at its center directed towards the contact button 6. This force, which increases with the temperature, at least as long as the strip 8 does not become deformed from the position indicated in Fig. 1, acts in a direction opposite to the total forces resulting from the initial constraint, which upon a "cold" condition of the strip 8 causes the strip 8 to be pressed upwardly against the inner side of the top wall of casing 10. When the temperature of the strip 8 reaches a critical point, the central portion thereof will separate from contact with the top wall of casing 10. During such movement, the reactions at the end supports 2 and 3 turn with the strip 8 around axes y—y' at the opposite anchored ends of the strip and toward the plane containing these axes. The value of their components normal to this plane diminishes, that is, the said total forces which oppose the aforesaid single, downward force, suddenly diminish at the instant when this still growing single force has already attained a high value. Strip 8, thus attracted, departs with a strongly accelerated speed towards contact button 6 and engages the same with an abrupt and positive action, thus closing an electrical circuit between the two lead conductors 5 and 11. The position of the button 6 is chosen in such a manner that engagement with strip 8 will take place at the moment in which strip 8 is approximately coincident with the plane containing the axes y—y' of the end supports 2 and 3. Thus there is also obtained a short delay in the opening of the thermostatic switch, i. e. a break between strip 8 and contact button 6 as the strip 8 cools down, and also a good contact pressure, at the same time preserving the advantage of an abrupt closing action of the strip 8 with the button 6.

In conclusion, it is to be understood that while the above described embodiment of the inventive concept has been found to be most practical, it is quite possible to make various minor changes in the construction and arrangement of the components without, however, departing from the spirit and scope of the invention as defined in the appended claims.

I claim:

1. In a miniature thermostatic switch of the bimetallic type, an assembly comprising an elongated metallic support strip, a pair of support members mounted in longitudinally spaced relation on said strip, a stationary contact member on said strip between said support members and a bimetallic strip disposed between and mounted at its opposite ends on said support members for flexing and oscillation of its ends about co-planar transverse axes at said support members, said bimetallic strip when in an unheated state being convexly curved in a direction away from said stationary contact member and said stationary contact member being located substantially in the plane containing said coplanar transverse oscillation axes; and a metallic casing for receiving and into which said assembly is slid longitudinally for encasing the latter, the convex side of said bimetallic strip bearing throughout a substantial portion of its length against the adjoining interior face of said casing with an initial force, and said strip when heated to a predetermined temperature being caused to deform and carry the intermediate portion thereof into engagement with said stationary contact member.

2. A thermostat as defined in claim 1 and which further includes means for adjusting the end pressure on said bimetallic strip thereby to effect a corresponding adjustment in the initial pressure at which the convex side thereof bears against the adjoining surface of said casing.

3. A thermostat as defined in claim 2 wherein said pressure adjusting means comprises a screw adapted to bear against one of said support members for said bimetallic strip.

4. A thermostat as defined in claim 3 and which further includes means for sealing in said adjusting screw in a particular position of adjustment.

5. A thermostat as defined in claim 3 and which further includes means sealing in the opposite ends of said casing thereby to seal in said assembly and seal in said adjusting screw in a particular position of adjustment.

6. A thermostat as defined in claim 1 wherein said elongated support strip is L-shaped and said casing is of rectangular configuration in cross-section and slides in contact with the base and back surfaces of said support strip.

References Cited in the file of this patent

UNITED STATES PATENTS

| 2,332,518 | Koci | Oct. 26, 1943 |
| 2,402,312 | Burch | June 18, 1946 |
| 2,773,962 | Perst | Dec. 11, 1956 |